United States Patent [19]

Starr et al.

[11] Patent Number: 5,341,255

[45] Date of Patent: Aug. 23, 1994

[54] DISC DRIVE HEAD POSITIONING SERVO SYSTEM WITH COHERENT ADJACENT TRACK MAGNETIC PATTERNS

[75] Inventors: James A. Starr, San Jose; Norman R. Sneddon, Aptos, both of Calif.

[73] Assignee: Seagate Technology, Inc., Scotts Valley, Calif.

[21] Appl. No.: 134,485

[22] Filed: Oct. 12, 1993

Related U.S. Application Data

[63] Continuation of Ser. No. 598,982, Oct. 17, 1990, abandoned.

[51] Int. Cl.$^5$ .............................................. G11B 5/596
[52] U.S. Cl. .................. 360/77.08; 360/78.14
[58] Field of Search ............... 360/77.08, 135, 78.14, 360/77.02, 77.01

[56] References Cited

U.S. PATENT DOCUMENTS

| | | | |
|---|---|---|---|
| 4,007,493 | 2/1977 | Behr et al. | 360/77.07 |
| 4,149,198 | 4/1979 | Behr et al. | 360/77.07 |
| 4,314,289 | 2/1982 | Haynes | 360/77.01 |
| 4,280,034 | 4/1983 | Krake | 360/77.02 |
| 4,400,746 | 8/1983 | Lequien | 360/77.08 |
| 4,511,938 | 4/1985 | Betts | 360/77.08 |
| 4,530,019 | 7/1985 | Penniman | 360/77.08 |
| 4,783,705 | 11/1988 | Moon et al. | 360/77.08 |
| 4,890,172 | 12/1989 | Watt et al. | 360/77.04 |
| 4,912,576 | 3/1990 | Janz | 360/77.08 X |

FOREIGN PATENT DOCUMENTS 1-37774  2/1989  Japan .

Primary Examiner—Aristotelis Psitos
Assistant Examiner—James T. Wilson
Attorney, Agent, or Firm—Flehr, Hohbach, Test, Albritton & Herbert

[57] ABSTRACT

A computer disc drive includes a disc with circumferentially arranged tracks, a number of sectors on each track, with each sector including positional and data fields. The disc drive also includes a servo system with a magnetic head, arm, motor, and servo signal processor. One track of the disc drive includes a number of sectors, with each of the sectors including a positional field. A second track of the disc drive includes a number of sectors, with each of the sectors including a positional field. The positional fields of the second track are in a phase variant relationship, or staggered configuration, with the positional fields of the first track. Thus, the magnetic head reading from the first track or the second track is assured of producing a coherent signal with positional information that is sufficient for the servo system to process, despite interfering magnetic patterns between the two tracks. The resulting variably coherent signal with positional information allows the servo system to reposition the arm to a desired position.

15 Claims, 7 Drawing Sheets

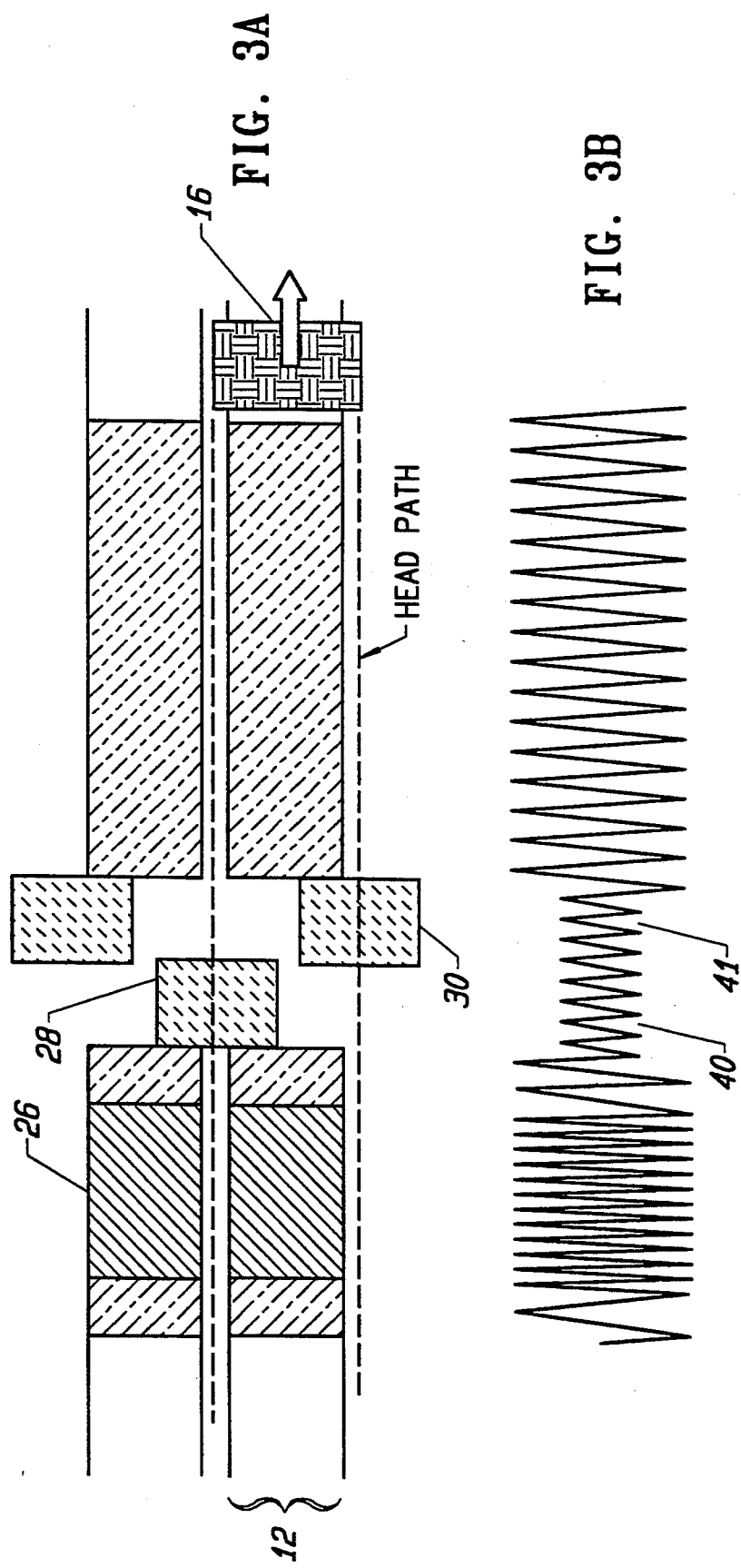

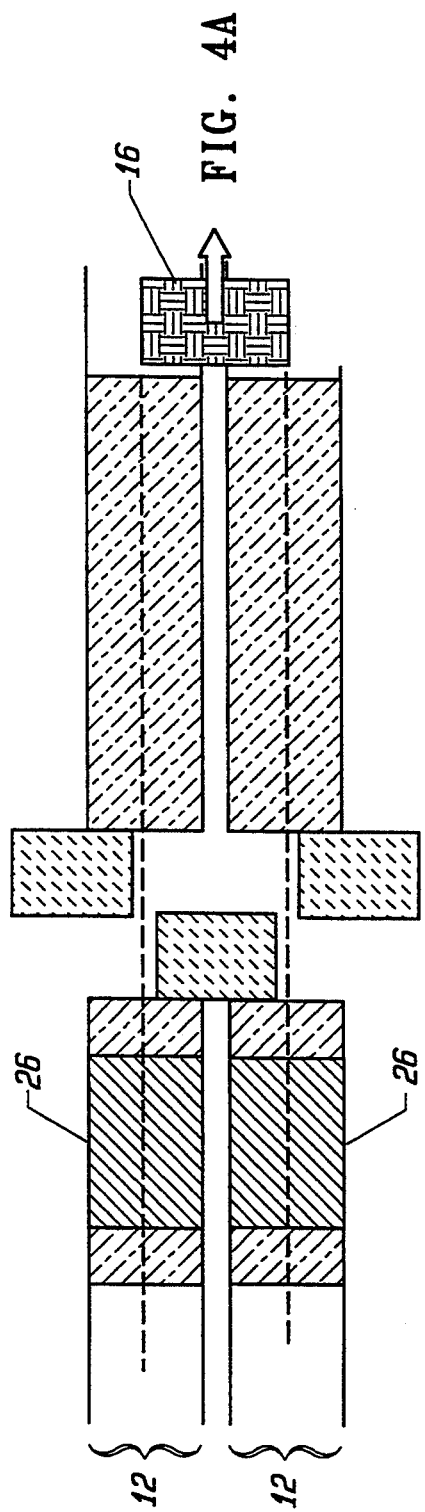
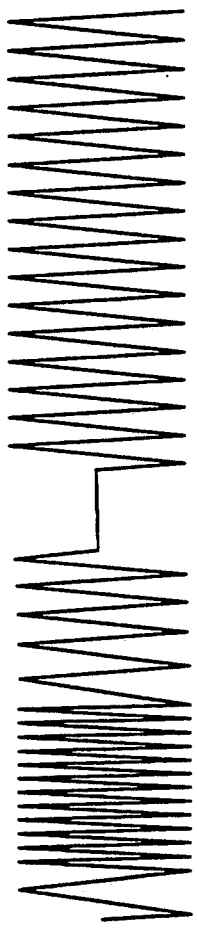
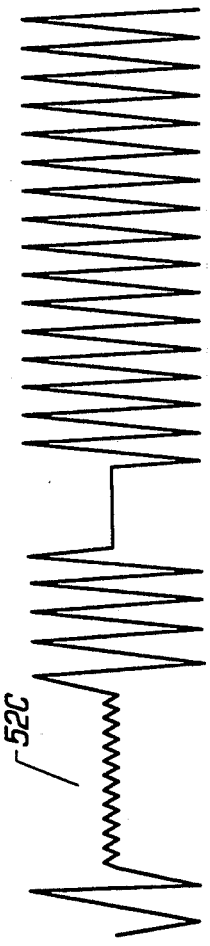
FIG. 4A
FIG. 4B
FIG. 4C

DISC DRIVE HEAD POSITIONING SERVO SYSTEM WITH COHERENT ADJACENT TRACK MAGNETIC PATTERNS

This is a continuation of application Ser. No. 07/598,982 filed Oct. 17, 1990, now abandoned.

BRIEF DESCRIPTION OF THE INVENTION

This invention relates to a magnetic head positioning servo system for a computer disc drive. More particularly, it relates to a method and apparatus for consistently generating coherent magnetic patterns on adjacent tracks of a disc drive.

BACKGROUND OF THE INVENTION

Computer disc drives are known in the art. Such systems include a number of coaxially arranged discs. Each disc is coated with a thin film of magnetic storage media. Each disc further includes a number of concentric tracks. Each track is divided into a number of sectors; data is stored in the sectors on each track.

For each disc, there is a magnetic head assembly, supported by an arm, which is selectively positioned over tracks on the disc to access the data. The width of the magnetic head is approximately equal to the width of a track.

In addition to reading and writing a user's data on the disc, the head is utilized as a position transducer component in a servo mechanism. Head position information is embedded directly on the tracks of each disc at the beginning of each sector. As the disc is rotated, the head reads the position information and transmits this information to a track position detector for processing. The actual position of the magnetic head is compared with its desired position. The difference is processed to generate a signal which is fed to a DC motor which re-positions the head at a corrected position. This servo procedure is repeated until the actual position of the head equals the desired position.

This radial positioning of the head assembly is typically undertaken in two steps. First, the head assembly seeks a particular track on the disc. This is achieved by processing position information associated with each sector of each track. That is, previously embedded sector information is read and processed as the head moves across the tracks of the disc. This step results in a rough positioning of the assembly relative to a desired track. In order to read a particular sector located on the track, in the next step, the head assembly is precisely positioned with respect to the target track. This is achieved by reading "A" and "B" servo bursts from their position centered half way between the center lines of data tracks adjacent to and on either side of the target track. The "A" and "B" bursts are processed and the head position is adjusted such that the signal from the "A" burst equals that from the "B" burst. When the signals are equivalent, the read head is positioned on the track center line. This precise alignment is maintained until it is necessary to move to another track.

A problem associated with this technology is that the servo mechanism requires precise processing of all track position data. This is particularly necessary when the data is stored on discs in a high density configuration. However, as a result of vibrations, spindle bearing run-out and other factors, when writing track position information, the servo writer is not as accurate as necessary. Whole tracks of magnetic patterns may be misplaced slightly from their proper position both radially and circumferentially.

Radial misplacements may be controlled adequately with precision servowriter mechanics and position control systems. On the other hand, for high density magnetic patterns, circumferential mispositioning may result in adjacent tracks being written entirely out of phase with one another. Thus, as the head crosses between tracks, the two tracks may destructively interfere with one another, thereby resulting in a composite signal of undetectably small amplitude. In this case, position information is not gathered and the operation of the servo mechanism is seriously disrupted.

This problem is not readily solved. As track bit densities increase, achieving track-to-track coherence requires more exacting tolerances on mechanical parts. The requisite tolerances are difficult to obtain. Similarly, the problem is difficult to solve by adjusting variables such as non-repeatable bearing run-out, head skew angle, or timing jitter during servo pattern writing.

OBJECTS AND SUMMARY OF THE INVENTION

It is an object of the present invention to provide a disc drive head positioning servo system with coherent adjacent track magnetic patterns.

It is another object of the present invention to improve the positional feedback information obtained from interfering adjacent tracks of a disc drive, without relying upon mechanical tolerances.

It is still another object of the present invention to improve the positional feedback information obtained from interfering adjacent tracks of a disc drive by guaranteeing partial signal coherence through phase modulation.

These and other objects are obtained by an improved computer disc drive. The disc drive includes a disc with circumferentially arranged tracks, a number of sectors on each track, with each sector including positional and data fields. The disc drive also includes a servo system with a magnetic head, arm, motor, and servo signal processor. More specifically, one track of the disc drive includes a number of sectors, with each of the sectors including a positional field. A second track of the disc drive includes a number of sectors, with each of the sectors including a positional field. The positional fields of the second track are in a phase variant relationship, or staggered configuration, with the positional fields of the first track. Thus, the magnetic head positioned midway between the first and second track and reading a servo burst from the first track and the second track is assured of producing a coherent signal with information that is strong enough for the servo system to process at some points around the disc revolution, despite interfering magnetic patterns between the two tracks. The resulting variably coherent signal with positional information allows the servo system to reposition the magnetic head to a desired position.

BRIEF DESCRIPTION OF THE FIGURES

Other objects and advantages of the invention will become apparent upon reading the following detailed description and upon reference to the drawings in which:

FIG. 3 is a schematic view of a magnetic head reading magnetic information from a data-track-centered position and a representation of a signal the head may produce in that position, according to the prior art;

FIG. 4A is a schematic view of a magnetic head reading magnetic information from a position half way between two data track positions, according to the prior art;

FIG. 4B depicts signals the head may produce in a non-destructive coherence condition of the magnetic patterns on the two tracks;

FIG. 4C depicts signals the head may produce in a destructive coherence condition of the magnetic patterns on the two tracks;

DETAILED DESCRIPTION OF THE INVENTION

Figure 1:
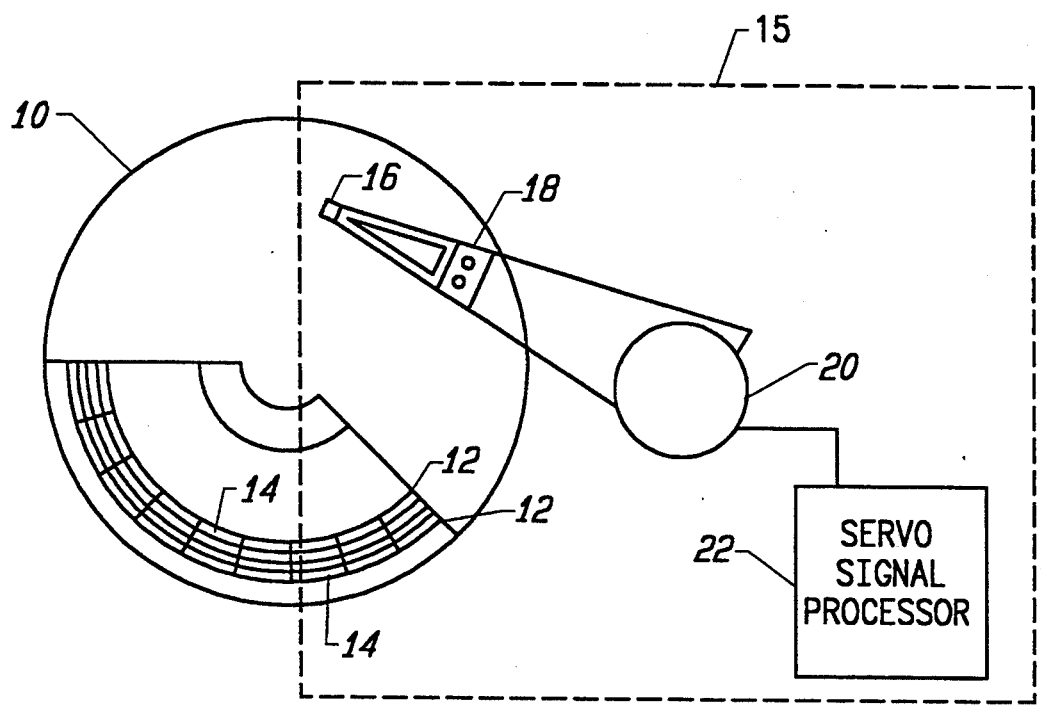
FIG. 1 is a plan view of a servo system and a disc of a disc drive according to the prior art.

Turning now to the drawings, wherein like components are designated by like reference numerals in the various figures, attention is initially directed to FIG. 1. The figure depicts a disc 10 including a number of circumferentially arranged tracks 12. Each track 12 includes a number of sectors 14. Servo system 15, shown in phantom, includes a magnetic head 16 supported by an arm 18. The arm 18 is positioned by the motor 20. Servo signal processor 22 processes the servo signal information and adjusts the position of the magnetic head 16, in accordance with the prior art.

Figure 2:
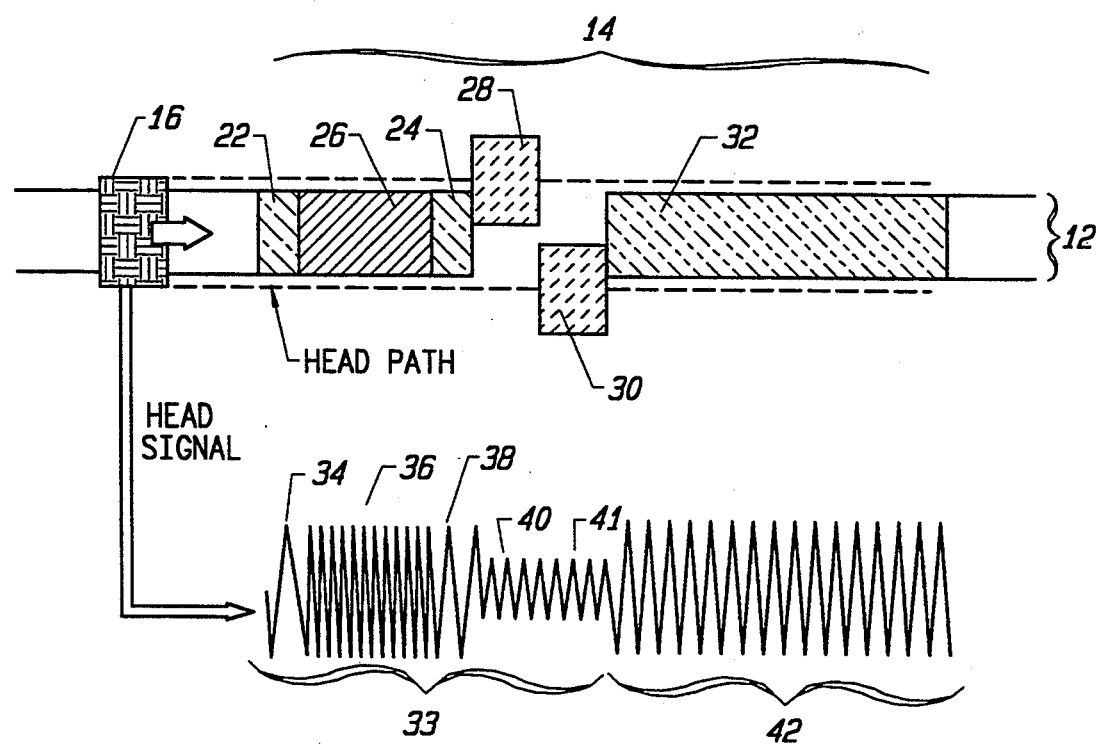
FIG. 2 is a plan view of a sector of a disc and the corresponding signal that the magnetic head reads from the sector according to the prior art.

Turning to FIG. 2, the top portion of the figure depicts a single sector 14 of a single track 12. The sector includes a first buffer region 22 and a second buffer region 24. Between the two buffers 22 and 24 is positional field information region 26, which magnetically stores an information or synchronization signal. An "A burst" signal 28 is depicted as positioned off the central axis of track 12. Similarly, a "B burst" signal 30 is depicted as positioned off the other side of the central axis of track 12. The final segment of sector 14 is data field 32 where the user's data is stored.

The bottom portion of FIG. 2 depicts a servo signal 33 and data signal 42 corresponding to sector 14. The frequency of the signal 33 varies in accordance with the different regions of the sector 14. By way of example, the first buffer 22 stores a 1.152 MHz signal which is reproduced in the first buffer servo signal segment 34. Next, the positional field information segment 26 stores a 3.686 MHz signal which is reproduced in positional information servo signal segment 36. Second buffer 24 stores a 2.304 MHz signal which is reproduced in the second buffer servo signal segment 38. The "A burst" 28 and "B burst" 30 store a 2.304 MHz signal which is reproduced in "A burst" servo signal segment 40 and "B burst" servo signal segment 41. Finally, data field 32 stores a 2.304 MHz signal which is reproduced in data field servo signal segment 42.

Procedures for processing and utilizing servo signal 33 are known in the art. For instance, the magnetic head 16 is precisely positioned with respect to track 12 by processing and utilizing the "A burst" servo signal segment 40 and the "B burst" servo signal segment 41. Specifically, magnetic head 16 is centered over track 12 by moving magnetic head 16 until "A burst" servo signal segment 40 is equal to "B burst" servo signal segment 41. This centering is then maintained by a sample-and-hold circuit while the magnetic head 16 moves over data field 32.

Before this precise positioning can be obtained, the "A" burst 28 and "B" burst 30 must be detected so that they can be compared to generate a position error signal. Before the "A" and "B" bursts can be detected, there must be a discernable positional or synchronization burst 26 to guide the servo processing electronics to properly time the detection of the "A" and "B" bursts.

FIG. 3 depicts a situation wherein positional or synchronization burst 26 is discernable. The head 16 is centered on the data track 12 so that there is no interference between the patterns stored on that track and any adjoining track because the path of the head does not pass over any part of the adjoining tracks. Because there is no such interference, the patterns are fully reproduced in signal segments as described for FIG. 2. The "A" and "B" bursts, 28 and 30 respectively, are partially included in the region under the path of the head and those magnetic patterns are partially reproduced in the head signal segments 40 and 41 as shown in the bottom of FIG. 3. There is no interference with these two signals because the disc surface adjoining these patterns is always unrecorded.

FIG. 4 depicts the same region on the disc as FIG. 3, but the head 16 is shown in a position such that its path includes approximately equal portions of two adjoining data tracks 12. In this position, there may be constructive interference or destructive interference between the portions of the two tracks' patterns which are detected simultaneously by the head. In the case where the pattern in the positional or synchronization segment 26 of one track is written such that it is "in phase" with the adjacent segment 26 of the other track, the two patterns interfere constructively, and the head reproduces a discernable servo signal 52B such as in FIG. 4B. In the case where these same two patterns are written "out of phase", they interfere destructively, and result in a servo signal segment 52C of insufficiently small amplitude for the servo signal processor 22 to determine the position of the head 16, a in FIG. 4C.

Thus, when the positional information fields 26 of adjacent tracks 12 interfere with one another and the head 16 is following a path exactly between position fields 26 on two adjacent tracks, the servo signal processor 22 can no longer track the position of the magnetic head 16. As track densities increase on disc drives, it is difficult to ensure that positional information from one track is written in such a manner that it will not interfere with the positional information on an adjacent track. When positional information on adjacent tracks interferes, it generally interferes along an entire revolution of the track, the servo signal processor is unable to obtain a discernable signal throughout a revolution of the disc, and is unable to identify the track position of the head and center the head 16 on the target track.

Figure 5:
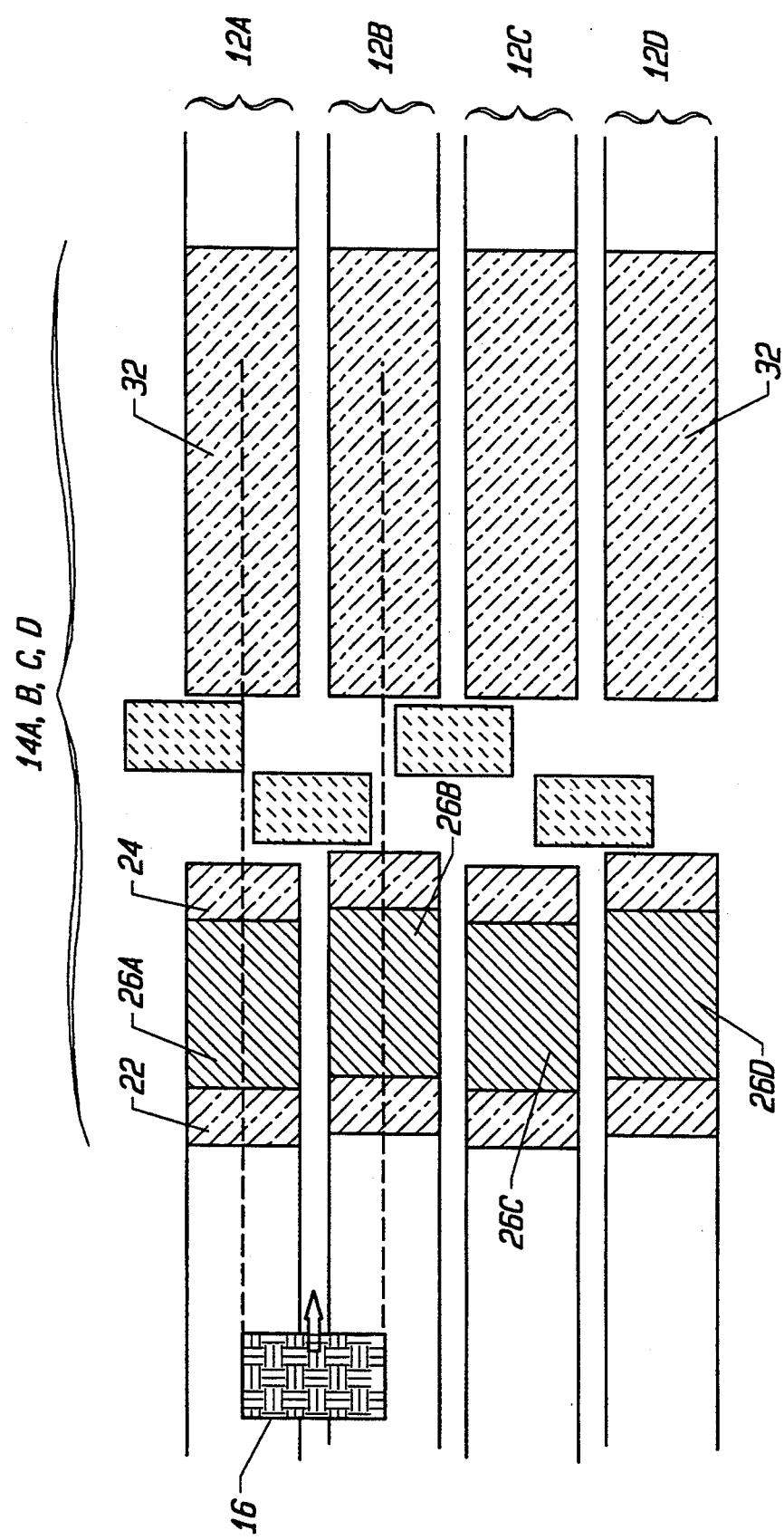
FIG. 5 is a plan view of one sector of a disc drive with phase variant positional field information on alternate tracks.

This shortcoming in the prior art is solved in accordance with the present invention which provides a disc drive head positioning servo system with coherent adjacent track magnetic patterns. Turning to FIG. 5, depicted therein are four adjacent data sectors 14A, 14B, 14C and 14D of adjacent tracks 12A, 12B, 12C, and 12D. The positional fields 26 of tracks 12B and 12C have been intentionally staggered a fraction of a cycle from the positional fields of adjacent tracks 12A and 12D. As depicted in the figure, the positional fields 26 are staggered; the same results are obtained if each sector 14 is staggered. A head 16 positioned exactly between two staggered positional fields 26A and 26B will always develop a sufficiently strong position signal to enable the servo system to read the A and B servo fields and correct the position of the head 16 onto the data track 12B to read the data in the sector. This time shift or staggering compensates for any accidental time shift introduced by tolerances or other uncontrolled phenomenon, thereby returning the two signals to a constructively interfering phase relationship. Since the amount of time shift needed to do this is unknown, many different time shifts are used at different sectors, ensuring good coherence at some fraction of them.

Figure 6B:
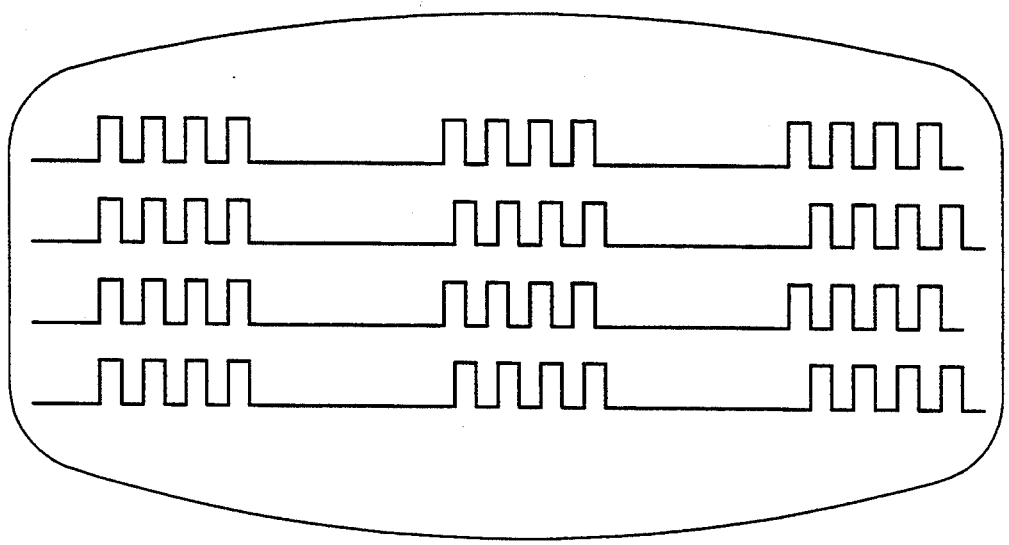
FIG. 6 is a schematic representation of the phase variation of positional fields of four adjacent tracks.
Figure 6A:
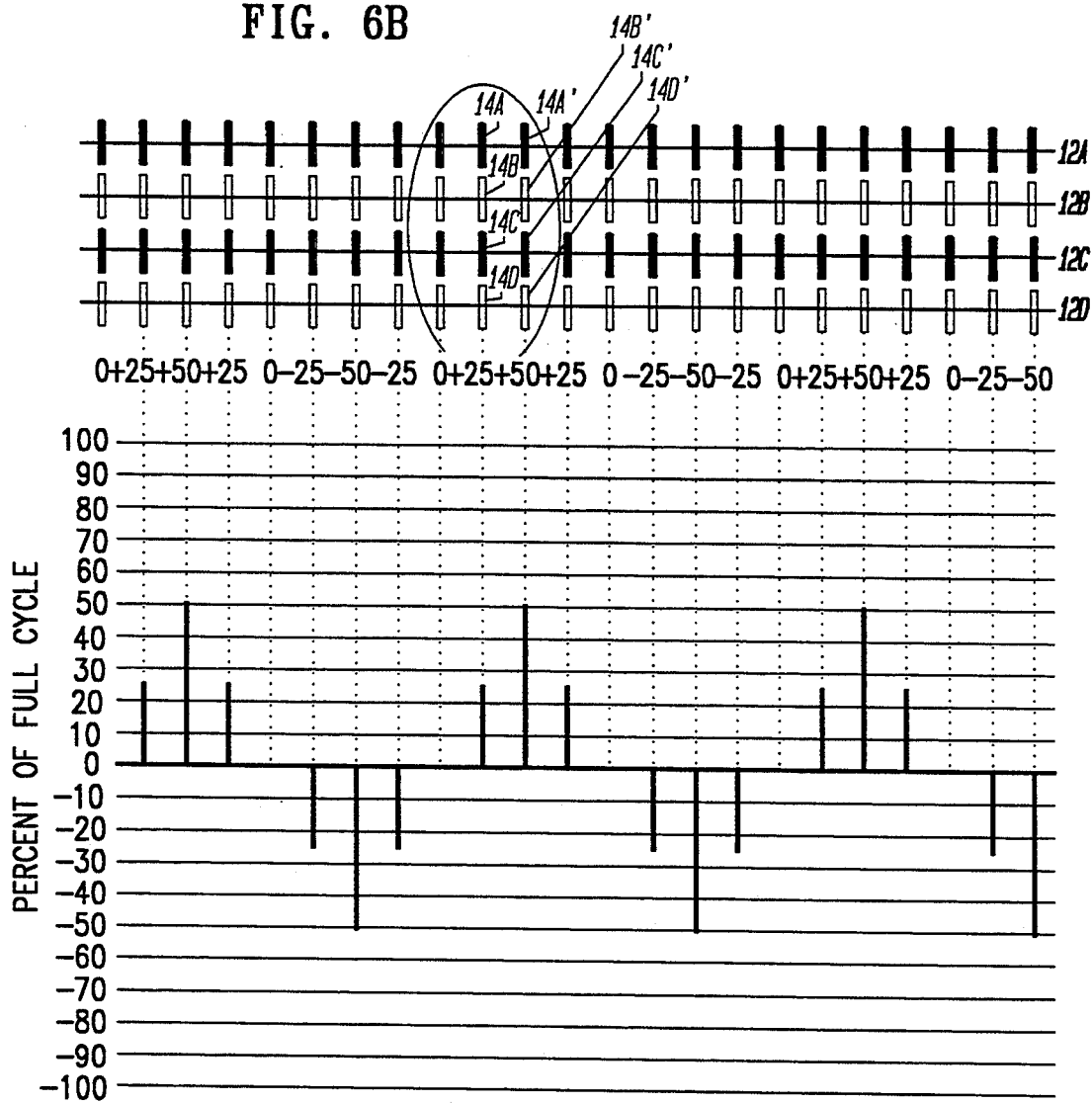

Turning next to FIG. 6, the figure shows at the center portion thereof a number of adjacent tracks, 12A, 12B, 12C, and 12D. On each of these tracks, only the positioned field which provides the sync signal for reading the servo fields A, B numbered 28, 30 on FIG. 2 are shown. The servo signals 28, 30 and data field 32 are omitted, but these signals lie between each positioned signal which is illustrated.

The position or sync signals are shown in expanded format at the top of the page, and at the bottom of the page is a chart which represents both the percentage of a full cycle by which the sync signal on one track is shifted with respect to the adjacent tracks, and also represents in general fashion the way that an output signal from a transducer 16 writing on a path exactly between two adjacent tracks would vary as it moves from sector to sector and the interfering sync signals from the adjacent tracks are more or less coherent.

Specifically, analogous to FIG. 6, there are four sectors 14A, 14B, 14C, and 14D corresponding to four tracks 12A, 12B, 12C, and 12D. Sectors 14B and 14D, and analogously unshaded sectors, are staggered a fraction of a cycle from the sectors of the neighboring track. The resultant staggered and digitized square waveform for these sectors is depicted at the top of FIG. 6.

The exact amount of staggering of positional information in this embodiment of the invention is specifically revealed in the chart at the bottom of the figure. Specifically, sector 14B and 14D are shifted 25% of a cycle length compared to 14A and 14C. Similarly, 14B' and 14D' are shifted 50% of a cycle length compared to 14A' and 14C'. Staggering sectors at this frequency, there is a repetition rate of one full set of shifts every 8 sectors.

It should be noted that the staggering is mapped out so that first the sync bursts of one sector lead the sync bursts of sectors on the adjacent tracks with the staggering being achieved in gradual steps first leading 25 percent, then 50 percent, then back to 25 percent, and then in phase. Then the sync bursts continue to be adjusted so that they trail or lag the adjacent sync bursts in phase, first by 25, then by 50 percent. All this is clear from the numbers which appear at the bottom of the mid portion of FIG. 6 as well as the graph which comprises the bottom portion of FIG. 6.

Further, it should be noted that although much of this discussion has been in terms of staggering the sectors of adjacent tracks, in fact the essential feature of this invention is to stagger the sync bursts of adjacent tracks.

So long as the sync bursts 26 of adjacent tracks are staggered, the servo information in servo sectors 28, 30 can be read, and the head 16 brought into proper alignment with the data segment 32 of the sector 14.

Thus, as a magnetic head moves over these 8 sectors, it will encounter a successively changing phase relationship, or phase modulation, between adjacent tracks. That is, positional information signals will constructively and destructively interfere with one another over these 8 sectors. Since constructive interference is certain to occur over a cycle, this insures that a detectable positional information servo signal segment 36 will be detectable by servo signal processor 22 twice within 8 sectors. As a result, constant destructive interference between adjacent tracks will not prevent the servo signal processor 22 from identifying the location of the magnetic head 16.

One skilled in the art will recognize that as long as two adjacent tracks are altered with respect to one another one cycle within a revolution of the disc, the object of this invention is realized. Consequently, a number of formatted patterns are feasible. These formatted patterns are written by a servo writer in accordance with the prior art.

Figure 7:
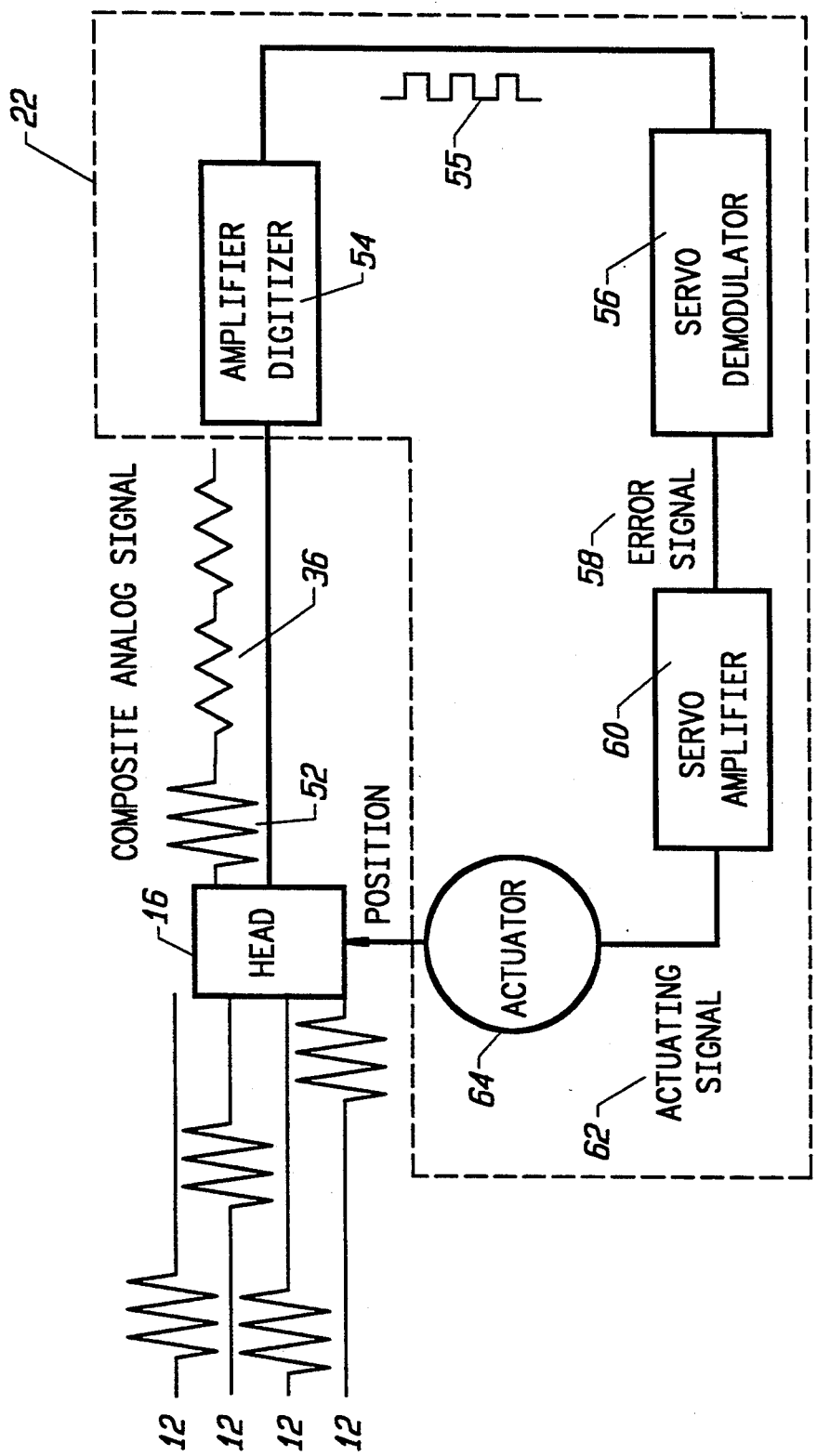
FIG. 7 is a block diagram of a disc drive servo system utilized in accordance with the present invention.

Turning now to FIG. 7, the heretofore described coherent adjacent track magnetic pattern is read by magnetic head 16, and the head signal output 36 processed by the electronics shown in this figure. The servo signal processor 22 interprets peak positional information servo segment (sync signal) 52 of servo signal segment 36. This coherent and processable signal results from the ensured constructive interference between adjacent tracks, even though the head 16 lies exactly between the tracks. Servo signal segment 36 (which results from reading servo sectors 28, 30) is fed to an amplifier and digitizer 54, and the resultant square wave 55 is fed to servo demodulator 56. Servo demodulator 56 produces an error signal 58 which is amplified by servo amplifier 60, producing an actuating signal 62 which is fed to actuator 64 which repositions the magnetic head 16 over the target track.

Thus, it is apparent that there has been provided, in accordance with the invention, a disc drive head positioning servo system with coherent adjacent track magnetic patterns, that fully satisfies the objects, aims, and advantages set forth above. While the invention has been described in conjunction with specific embodiments, it is evident that many alternatives, modifications, and variations will be apparent to those skilled in the art in light of the foregoing description. For example, it has been discovered that the approach described in the above preferred embodiment is especially useful in a disc drive incorporating a stepper motor, so that by monitoring the input to or position of the stepper motor, the system can efficiently detect when the target track is reached. Use of monitoring the stepper motor eliminates the need to count track crossings as the transducer crosses each track, an approach which may be undesirable because of the likelihood of occasionally crossing a track at a point exactly between two incoherent position or sync bursts, whereupon the track crossing would not be detected, and an incorrect track crossing count would result. Accordingly, the description is intended to embrace all such alternatives, modifications, and variations as fall within the spirit and scope of the appended claims.

What is claimed is:

1. A parallel track data storage system comprising:

a storage medium including parallel storage tracks, each of said parallel storage tracks comprising a plurality of sectors for storing data, each of said plurality of sectors being aligned radially on each of said parallel storage tracks;

a transducer for accessing data stored on said storage medium;

means for locating one of said parallel storage tracks, said means for locating including a position feedback field stored in each of said sectors of said parallel storage tracks, said position feedback field for storing a location value, wherein said location value is identical for all sectors on each individual track of said parallel storage tracks, and distinct as between any two of said each individual track on said storage medium;

means for ensuring detection of said position feedback field even when said transducer is positioned between an adjacent pair of said parallel storage tracks, said means for ensuring including time variant position feedback fields wherein a first of said adjacent pair of said parallel storage tracks includes a first position feedback field in each sector, and a second of said adjacent pair includes a second position feedback field which is offset in time as compared to said first position field in each sector, wherein said first and said second position feedback field are no longer radially aligned;

means for centering said transducer over said parallel storage tracks, said centering means including periodic burst position signals stored on each said parallel storage tracks preceding said position feedback field, wherein on adjacent pairs of said tracks at least some said periodic burst position signals are offset in time wherein said offset in time of said periodic burst position signals is a phase shift away from radial alignment between a first periodic burst position signal on a first parallel data storage track and a second periodic burst position signal located on an adjacent parallel storage track, which phase shift is cumulatively incremented over successive of said plurality of sectors on said first parallel storage track to advance said shift at least a full cycle over said first parallel storage track;

servo means, coupled to said transducer, for positioning said transducer over said storage medium in response to said stored location value;

said servo means detecting and responding to said location value stored in said position feedback field to position said transducer over one of said parallel storage tracks, said servo means detecting and responding to said periodic burst position signals to center said transducer over said one of said parallel storage tracks.

2. The parallel track data storage system of claim 1, wherein:

said storage medium includes a magnetic disk;

said parallel storage tracks are arranged concentrically around said disk; and said tracks define said sectors, each said sector being preceded by one of said periodic burst position signals.

3. The parallel track data storage system of claim 1, wherein said phase shift is cyclically altered around said first parallel storage track with a periodicity of at least one complete cycle per track.

4. The parallel track data storage system of claim 1, wherein said offset in time of said position feedback field is a phase shift away from radial alignment between a first position feedback field on a first parallel storage track and a second position feedback field located on a adjacent parallel storage track, which phase shift is cumulatively incremented over successive of said plurality of sectors on said first parallel storage track to advance said shift at least a full cycle over said first parallel storage track.

5. The parallel track data storage system of claim 4, wherein said phase shift is cyclically altered around said first parallel storage track with a periodicity of at least one complete cycle per track.

6. The parallel track data storage system of claim 1, wherein said position feedback fields on one said track are phase shifted relative to adjacent tracks by first being shifted such that said position feedback fields lead then lag relative to said position feedback fields on said adjacent tracks such that a full cycle of phase shifting is achieved.

7. In a parallel track data storage system including a storage medium with parallel storage tracks that define sectors for storing data, each said sector including a position feedback field, and a transducer for accessing data stored on said storage medium, said transducer being positionable by a servo system, a method ensuring detection of said position feedback field and centering said transducer over one of said parallel storage tracks even when said transducer is positioned between an adjacent pair of said parallel storage tracks, the method comprising the following steps:

storing a location value in said position feedback field in each of said sectors of said parallel storage tracks, wherein said location value is identical for all sectors on each individual track of said parallel storage tracks, and distinct as between any two of said each individual track on said storage medium;

providing means for ensuring detection of said position feedback field, said means for ensuring including time variant position feedback fields wherein a first of said adjacent pair of said parallel storage tracks includes a first position feedback field in each sector, and a second of said adjacent pair includes a second position feedback field which is offset in time as compared to said first position field in each sector, wherein said first and said second position feedback field are no longer radially aligned;

storing on each of said tracks preceding said position feedback field a periodic burst of a position signal;

providing means for centering said transducer over said parallel storage tracks, said centering means including periodic burst position signals stored on each said parallel storage tracks preceding said position feedback field, wherein on adjacent pairs of said tracks, at least some of said bursts are offset in time such that the phase relationship between said periodic bursts on said adjacent pairs of tracks progressively changes a fraction of a cycle per burst wherein said offset in time of said periodic burst position signals is a phase shift away from radial alignment between a first periodic burst position signal on a first parallel data storage track and a second periodic burst position signal located on an adjacent parallel storage track, which phase shift is cumulatively incremented over successive of said plurality of sectors on said first parallel storage track to advance said shift at least a full cycle over said first parallel storage track;

roughly positioning said transducer over one of said parallel storage tracks by said servo system by detecting and responding to said position feedback fields;

centering said transducer over said one of said parallel storage tracks by said servo system by detecting and responding to said periodic burst position signals; wherein said transducer straddling adjacent pairs of said tracks responds to a sufficient number of differently interfering said periodic bursts that said servo system is able to position said transducer over one of said parallel storage tracks.

8. The method of claim 7, wherein:
said storage medium is a magnetic disk;
said parallel storage tracks are arranged concentrically around said disk, and
said tracks define said sectors, each said sector being preceded by one of said periodic burst position signals.

9. The method of claim 7, wherein said position signal bursts on one said track are phase shifted relative to adjacent tracks by first being shifted such that said position signal bursts lead then lag relative to the bursts on said adjacent tracks such that a full cycle of phase shifting is achieved.

10. The method of claim 7, wherein said offset in time of said position feedback field is a phase shift away from radial alignment between a first position feedback field on a first parallel storage track and a second position feedback field located on an adjacent parallel storage track, which phase shift is cumulatively incremented over successive of said plurality of sectors on said first parallel storage track to advance said shift at least a full cycle over said first parallel storage track.

11. The method of claim 10, wherein said phase shift is cyclically altered around said first parallel storage track with a periodicity of at least one complete cycle per track.

12. The method of claim 7, wherein said position feedback fields on one said track are phase shifted relative to adjacent tracks by first being shifted such that said position feedback fields lead then lag relative to said position feedback fields on said adjacent tracks such that a full cycle of phase shifting is achieved.

13. A parallel track data storage system comprising:
a storage medium including parallel storage tracks, each of said parallel storage tracks comprising a plurality of sectors for storing data, each of said plurality of sectors being aligned radially on each of said parallel storage tracks;

a transducer for accessing data stored on said storage medium;

means for locating one of said parallel storage tracks, said means for locating including a position feedback field stored in each of said sectors of said parallel storage tracks, said position feedback field for storing a location value, wherein said location value is identical for all sectors on each individual track of said parallel storage tracks, and distinct as between any two of said each individual track on said storage medium;

means for ensuring detection of said position feedback field even when said transducer is positioned between an adjacent pair of said parallel storage tracks, said means for ensuring including time variant position feedback fields wherein a first of said adjacent pair of said parallel storage tracks includes a first position feedback field in each sector, and a second of said adjacent pair includes a second position feedback field which is offset in time as compared to said first position field in each sector, wherein said first and said second position feedback field are no longer radially aligned, wherein said offset in time of said position feedback field is a phase shift away from radial alignment between a first position feedback field on a first parallel data storage track and a second position field signal located on an adjacent parallel storage track, which phase shift is cumulatively incremented over successive of said plurality of sectors on said first parallel storage track to advance said shift at least a full cycle over said first parallel storage track;

servo means, coupled to said transducer, for positioning said transducer over said storage medium in response to said stored location value;

said servo means detecting and responding to location value stored in said position feedback field to position said transducer over one of said parallel storage tracks.

14. The parallel track data storage system of claim 13, wherein said phase shift is cyclically altered around said first parallel storage track with a periodicity of at least one complete cycle per track.

15. The parallel track data storage system of claim 13, wherein said position feedback fields on one said track are phase shifted relative to adjacent tracks by first being shifted such that said position feedback fields lead then lag relative to said position feedback fields on said adjacent tracks such that a full cycle of phase shifting is achieved.

* * * * *